US006450473B1

(12) United States Patent
Kondo et al.

(10) Patent No.: US 6,450,473 B1
(45) Date of Patent: Sep. 17, 2002

(54) DYNAMIC DAMPERS, AND A DAMPING SUPPORT APPARATUS FOR A VEHICLE BODY USING THE DYNAMIC DAMPERS

(75) Inventors: Kenji Kondo; Noriyuki Miyamaru, both of Sakai (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/654,100

(22) Filed: Aug. 31, 2000

(30) Foreign Application Priority Data

Nov. 30, 1999 (JP) .......................................... 11-340687
Jun. 20, 2000 (JP) ........................................ 2000-185243

(51) Int. Cl.[7] .............................................. F16M 13/00
(52) U.S. Cl. ....................................... 248/560; 248/562
(58) Field of Search ................................ 248/560, 608, 248/609, 566, 573, 638, 647, 550, 562; 180/89.13, 89.15, 89.14

(56) References Cited

U.S. PATENT DOCUMENTS 5,582,385 A * 12/1996 Boyle ........................ 248/550
5,649,685 A * 7/1997 Keller ........................ 248/638
5,725,066 A * 3/1998 Beard et al. ............. 180/89.12
6,070,681 A * 6/2000 Catanarite et al. ....... 180/89.15
6,161,821 A * 12/2000 Leno et al. ............... 267/64.24
6,276,653 B1 * 8/2001 Traxler ........................ 248/562

* cited by examiner

Primary Examiner—Leslie A. Braun
Assistant Examiner—A. Joseph Wujciak, III
(74) Attorney, Agent, or Firm—Webb Ziesenheim Logsdon Orkin & Hanson, P.C.

(57) ABSTRACT

A damping support apparatus for fixing an onboard structure such as a framework (9H) of a cab (9) to a vehicle body (4). The apparatus includes support brackets attached to the vehicle body (4), cushion couplings (11) each disposed between the onboard structure and one of the support brackets, and dynamic dampers (12) each attached to one of the support brackets and adjacent one of the cushion couplings. Each of the dynamic dampers (12) includes a cylindrical holder (13), mounting brackets (25) formed on the holder and having connecting portions for connection to the support bracket, a bar-shaped dampermass (15) mounted in the holder so as to form a gap (14) with an inner peripheral surface (13A) of the holder, and elastomers (16) disposed in at least part of the gap.

14 Claims, 7 Drawing Sheets

DYNAMIC DAMPERS, AND A DAMPING SUPPORT APPARATUS FOR A VEHICLE BODY USING THE DYNAMIC DAMPERS

BACKGROUND OF THE INVENTION

1. Field of the Invention

This invention relates to dynamic dampers and a damping support apparatus using the dynamic dampers for a vehicle body such as a tractor body.

2. Description of the Related Art

A tractor has problems relating to vibrations such as engine vibration and running vibration. Such vibrations cause not only human body vibrations such as a whole body vibration and a local vibration (vibrations of hands and arms) of the driver, but malfunctioning and damage of various components.

As countermeasures against such vibrations, for example, a tractor cab is supported in independent suspension through rubber mounts, and dampermasses (mass members) provided for fenders or the like for varying (shifting) resonance points of vibration.

In the prior art, however, somewhat unsatisfactory results are obtained from the vibration absorption and shifting of resonance points in reducing vibration and booming noise. Further, the construction required for such an effort is complicated and costly.

SUMMARY OF THE INVENTION

The object of this invention, therefore, is to provide dynamic dampers and a damping support apparatus using the dynamic dampers for a vehicle body such as a tractor body, which are simple in construction, and yet are capable of reliably reducing vibration and booming noise.

The above object is fulfilled, according to this invention, by a dynamic damper comprising a cylindrical holder, a bar-shaped dampermass mounted in the holder so as to form a gap with an inner peripheral surface of the holder, and an elastomer disposed in at least part of the gap.

The above construction is simple, and yet is capable of not only shifting a resonance point of vibration with the mass of the bar-shaped dampermass, but reducing the transmission of vibration in a particular frequency range with the elastomer. Since the simple construction in which the bar-shaped dampermass is mounted in the cylindrical holder is provided, there is no need to employ a complicated construction for supporting the dampermass as seen in the prior art. That is, the dynamic damper according to this invention has a simple and inexpensive construction and assures a vibration damping effect.

In another aspect of this invention, the above object is fulfilled by a damping support apparatus for fixing an onboard structure such as a cab framework to a vehicle body, comprising support brackets attached to the vehicle body, cushion couplings each disposed between the onboard structure and one of the support brackets, and dynamic dampers each attached to one of the support brackets and adjacent one of the cushion couplings, each of the dynamic dampers including a cylindrical holder, mounting brackets formed on the holder and having connecting portions for connection to the support bracket, a bar-shaped dampermass mounted in the holder so as to form a gap with an inner peripheral surface of the holder, and an elastomer disposed in at least part of the gap.

The above damping support apparatus employs the dynamic dampers according to this invention having a number of advantages as noted hereinbefore. Thus, the apparatus reduces, effectively and at low cost, the driver's fatigue and damage of various components due to vibration (and noise) of the vehicle body.

As a preferred embodiment of this invention, a construction is proposed in which the holder has caps attached to opposite ends thereof for restricting movement in longitudinal directions of the bar-shaped dampermass. The caps may be formed of an elastomeric material for elastically restricting movement in the longitudinal directions of the bar-shaped dampermass. With the caps formed of an elastomeric material, movement in the longitudinal directions of the bar-shaped dampermass is expected to reliably reduce the transmission of vibration in a particular frequency range. Furthermore, the caps may be constructed to seal the cylindrical holder. This will render the interior of the cylindrical holder waterproof to protect the bar-shaped dampermass from rain and mud.

As the elastomer for elastically supporting the bar-shaped dampermass, a plurality of O-rings may be mounted, as spaced from each other, peripherally of the bar-shaped dampermass. This construction provides an advantage in terms of cost. In this case, the bar-shaped dampermass may define circumferential grooves, with the O-rings mounted therein. This construction will prevent displacement of the O-rings, and facilitate assembly of dampermass to the cylindrical holder.

As a preferred arrangement of the dynamic dampers in the damping support apparatus, it is proposed to attach support brackets as cantilevers to the vehicle body, and place the dynamic dampers between the cushion couplings and free ends of the support brackets. An improved vibration damping effect is expected by arranging the dynamic campers adjacent the free ends of the support brackets.

Further, the support brackets may be box-shaped to contain the dynamic dampers therein, respectively. The support brackets then act as protective covers for the dynamic dampers.

Other features and advantage s of this invention will be apparent from the following description of the embodiments to be taken with reference to the drawings.

DESCRIPTION OF THE PREFERRED EMBODIMENTS

Embodiments of this invention will be described hereinafter with reference to the drawings.

Figure 1:
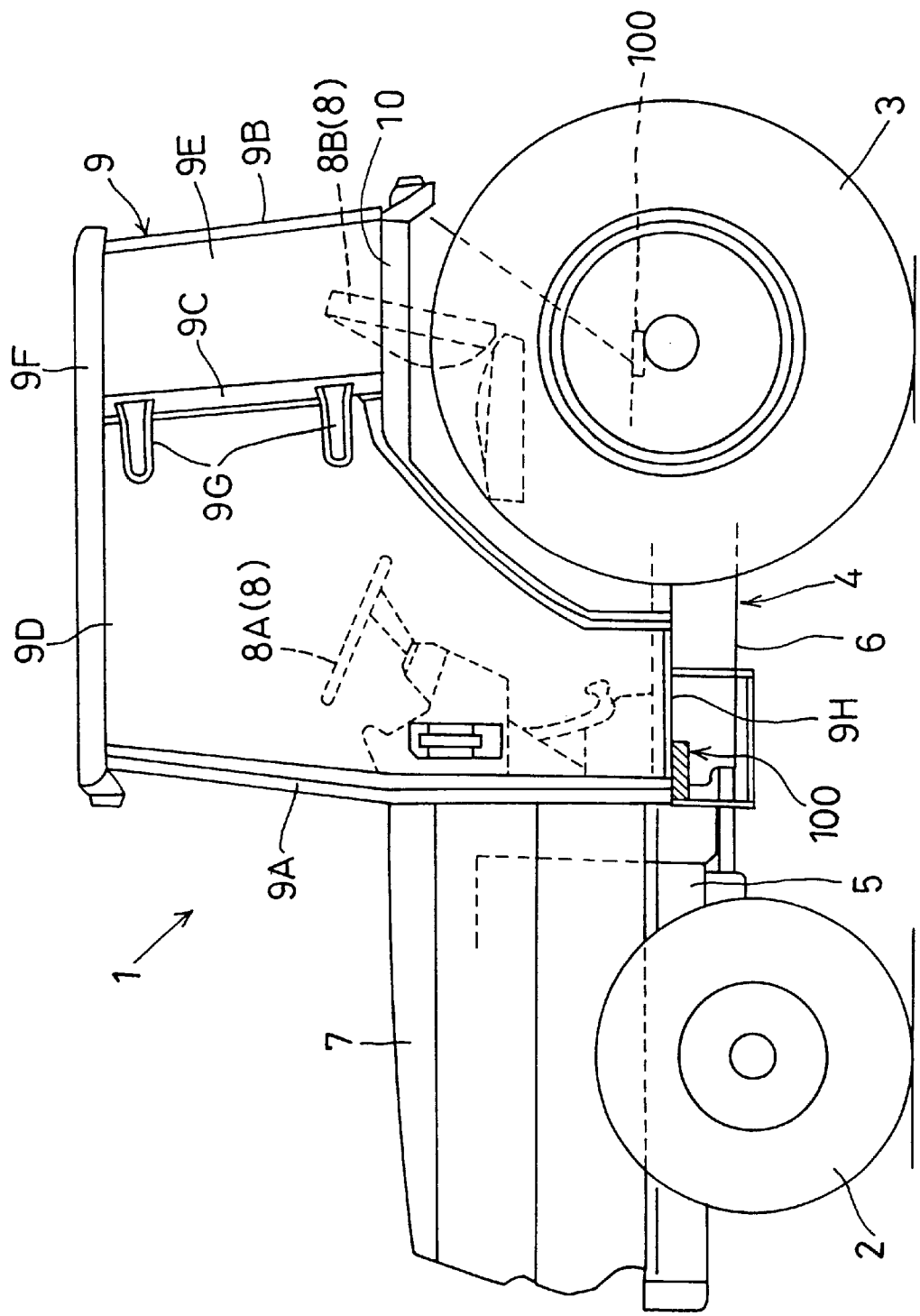
FIG. 1 is an exploded perspective view of a damping support apparatus one embodiment of this invention.

FIG. 1 shows a tractor as a vehicle employing a dynamic damper according to this invention. The tractor 1 exemplifies a two-axle four-wheel vehicle having right and left front wheels 2 and right and left rear wheels 3. A tractor body 4 includes an engine 5, a clutch housing and a transmission case 6 arranged rearwardly and rigidly connected to one another. The engine 5 is mounted in an engine room defined by a hood 7.

The tractor 1 is a cab tractor having a driving platform 8 with a steering wheel 8A and a driver's seat 8B arranged in fore and aft positions and enclosed in a cab 9. The cab 9 has a framework with right and left front posts 9A, right and left rear posts 9B, and right and left intermediate posts 9C erected on right and left fenders 10. The framework has right and left door panels (door windows) 9D openably supported through upper and lower hinges 9G, a front panel (windshield), side panels (side windows) 9E, a rear panel (rear window) and a top cover 9F. The cab 9, along with a floor sheet, is supported in independent suspension by a damping support apparatus 100 in front and rear, right and left positions on the tractor body 4.

A dynamic damper 12 according to this invention and the damping support apparatus 100 using the dynamic damper are employed for the right and left posts (including steps 9H and the floor sheet forming part of the framework).

Figure 2:
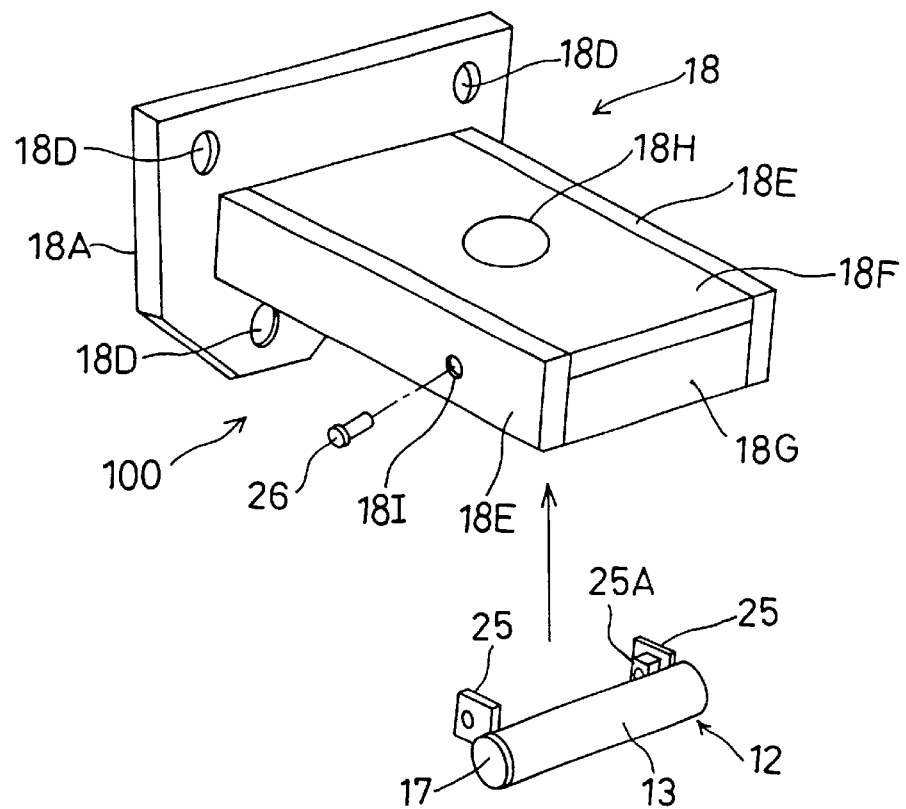
FIG. 2 is an exploded perspective view of a dynamic damper in one embodiment of this invention.
Figure 3:
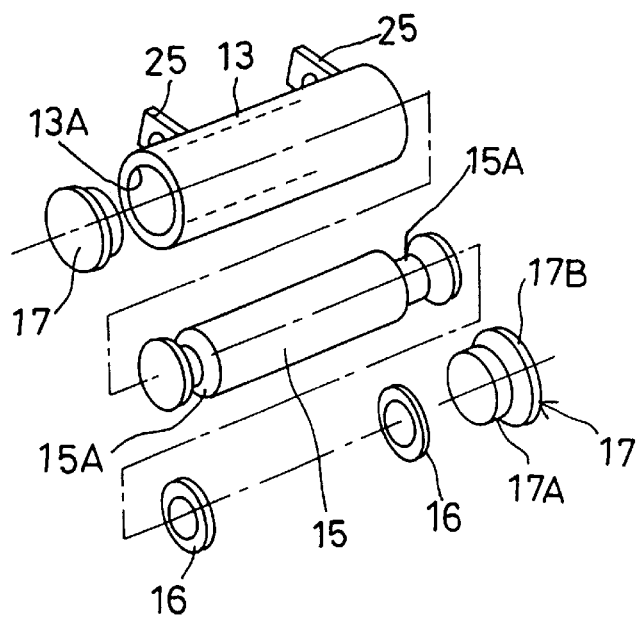
FIG. 3 is a bottom view of the damping support apparatus shown in FIG. 1.
Figure 4:
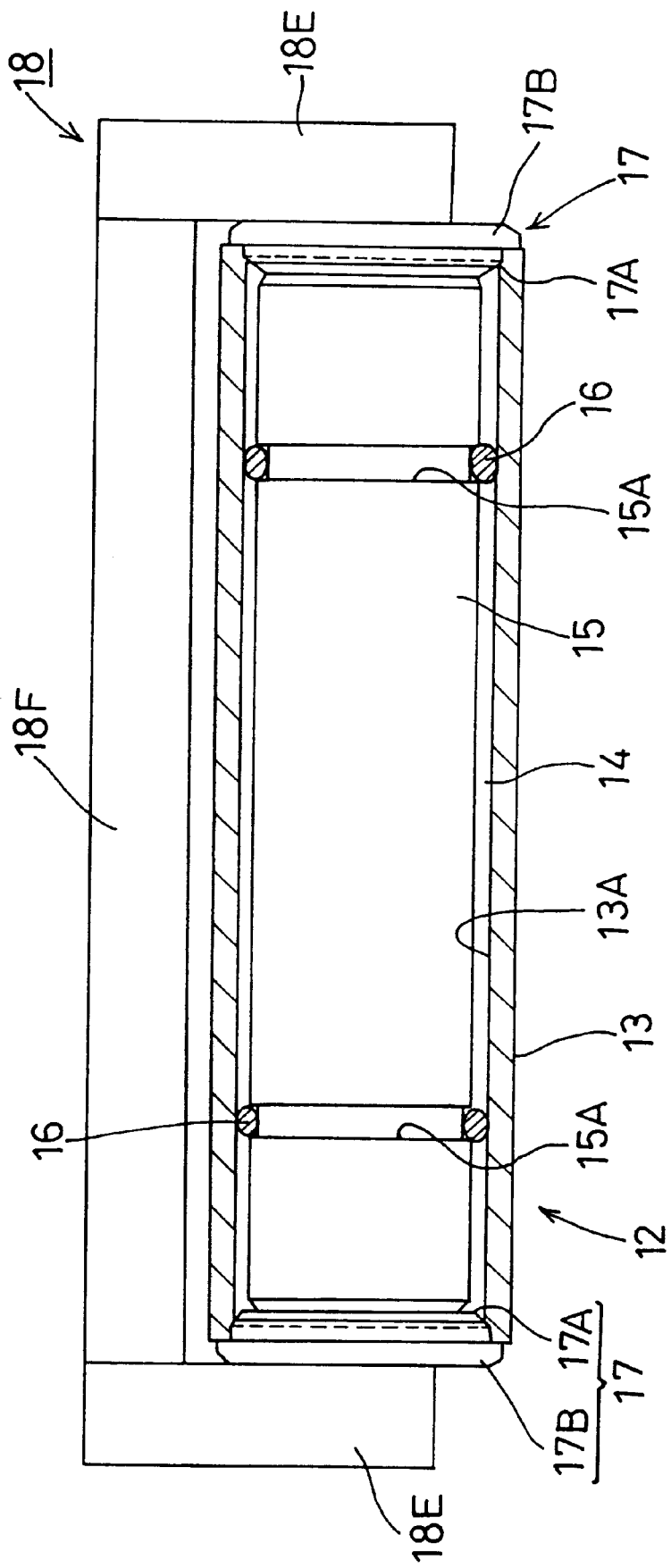
FIG. 4 is a section taken on line A—A of FIG. 2.

As shown in FIGS. 2 through 4, the dynamic damper 12 in this invention includes a cylindrical holder 13, a bar-shaped dampermass 15 mounted in the holder 13 so as to form a gap 14 with an inner peripheral surface 13A of the holder 13, and elastomers (damping elements) 16 mounted in the gap 14 for elastically supporting the bar-shaped dampermass 15.

The cylindrical holder 13 has caps 17 removably attached to opposite end openings thereof As shown in FIGS. 3 and 4, each cap 17 includes an insert shank portion 17A inserted into one of the opposite end openings of holder 13, and a flange portion 17B The caps 17 are attached to the holder 13 to restrict movement in longitudinal directions (i.e. fall-off) of the bar-shaped dampermass 15 in the holder 13.

The caps 17 may be formed of metal (e.g. aluminum alloy). However, to elastically restrict movement of the bar-shaped dampermass 15, it is advantageous from the point of view of vibration absorption that the caps 17 are formed of an elastomeric material such as rubber or resin.

The elastomers 16 mounted in the gap 14 may be a tubular element formed of an elastic material such as rubber or resin and covering the whole (i.e. entire length) of the bar-shaped dampermass 15. In this embodiment, however, the elastomers 16 are in the form of O-rings fitted in a plurality of (e.g. two) circumferential grooves 15A formed in the bar-shaped dampermass 15 and spaced from each other longitudinally of the dampermass 15.

In FIG. 3, the circumferential grooves 15A are formed in opposite end regions of the bar-shaped dampermass 15, but may be formed in middle regions, instead. The caps 17 are attached to the opposite end openings of the holder 13. Instead, the holder 13 may be a bottomed holder with one end thereof closed, with one cap 17 to the opening at the opposite end. In any case, the caps 17 has a function for waterproofing the interior of holder 13.

The dynamic damper 12 having the above construction shifts a resonance point of vibration due to an increase in the mass of bar-shaped dampermass 15 (which, in this sense, should preferably be formed of a metal of high specific gravity such as steel or lead). The elastic support provided by the elastomers 16 effectively reduces vibration transmission in a particular frequency range.

The holder 13, bar-shaped dampermass, 15 and caps 17 may be designed in various ways. Where, for example, the holder 13 is the form of a square tube, the dampermass 15 may be formed into a square bar, and the caps 17 to be square also.

Figure 5:
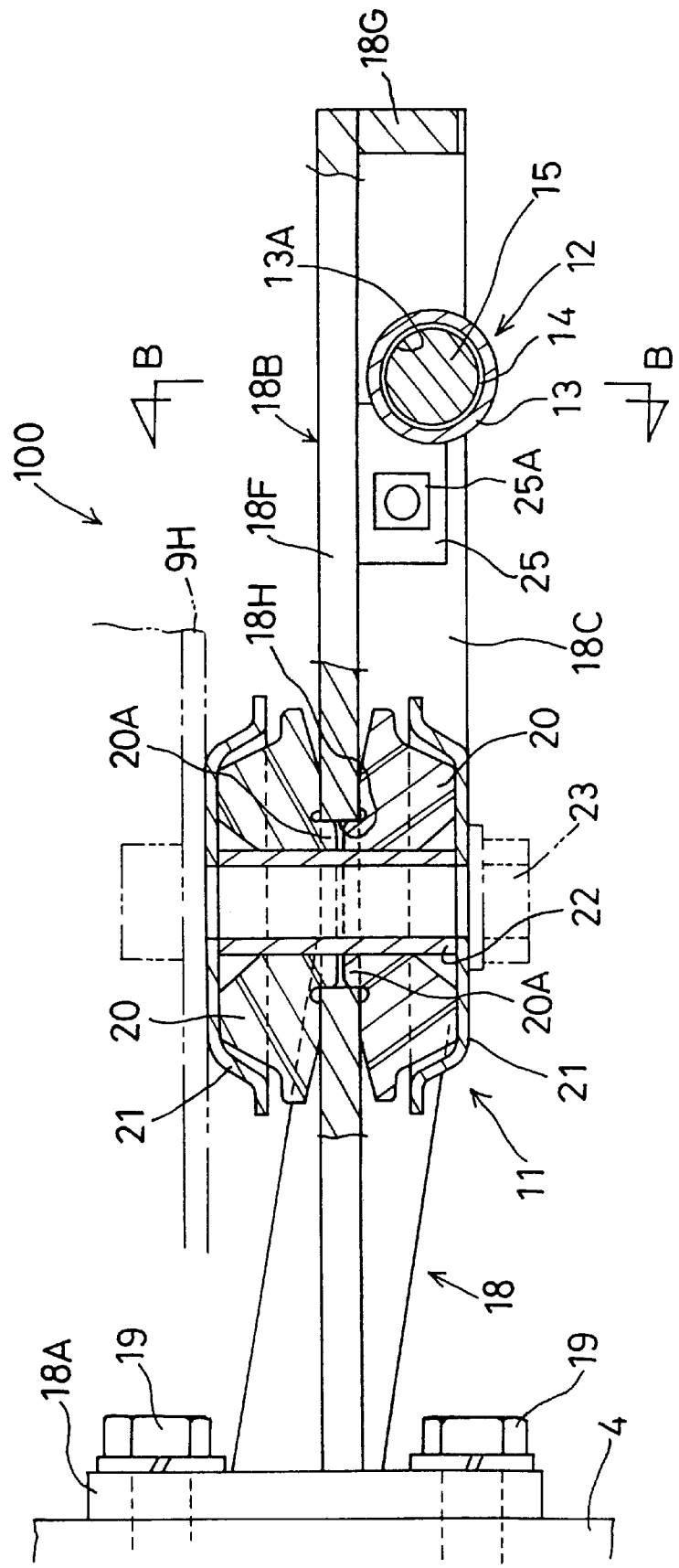
FIG. 5 is a section taken on line B—B of FIG. 3.
Figure 6:
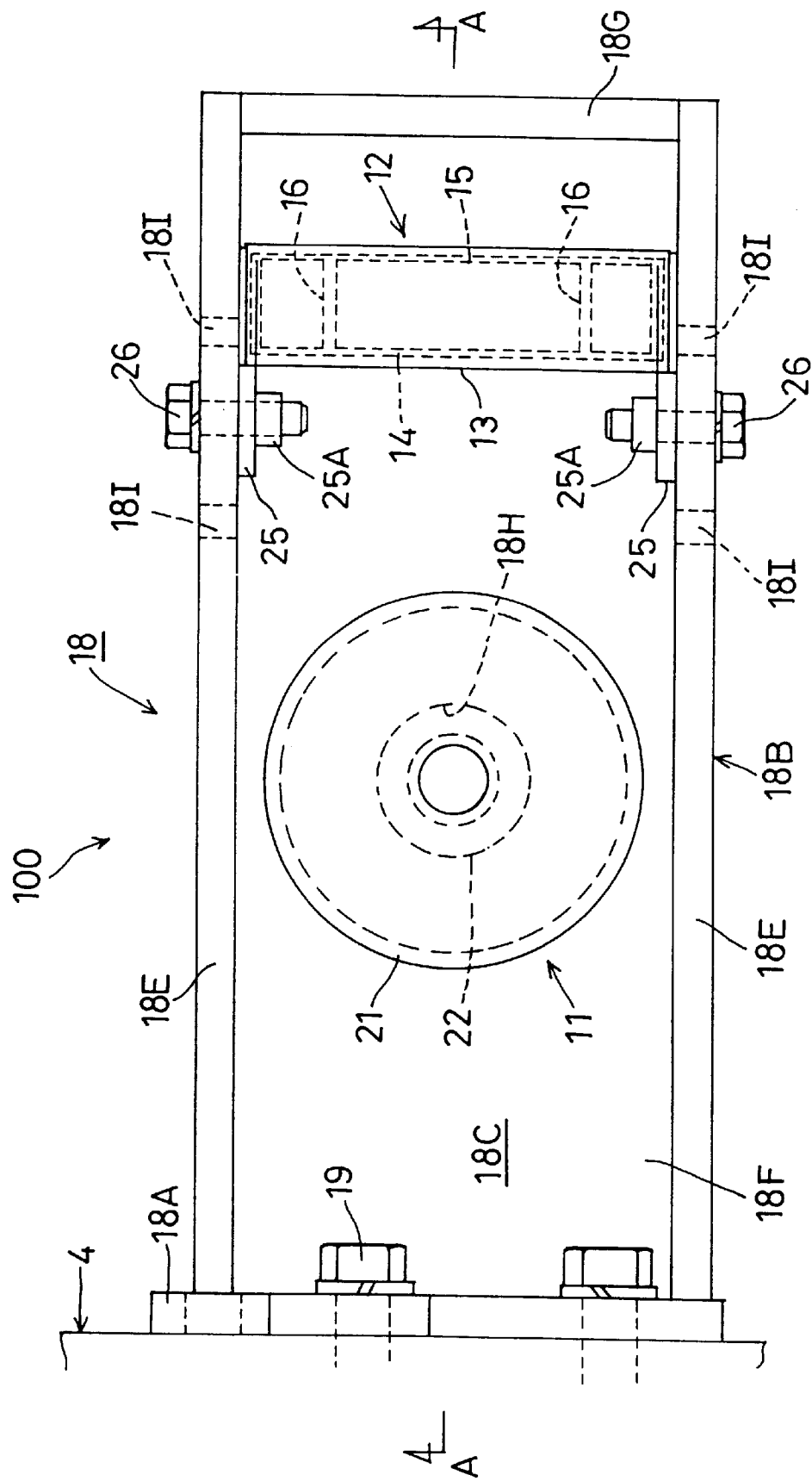
FIG. 6 is a sectional view showing another example of cushion coupling.

The dynamic damper 12 is mounted in a support bracket 18 as shown in FIGS. 5 and 6. Such support brackets 18 are fixed to right and left vertical surfaces (side walls) of the tractor body 4 to project horizontally outward therefrom.

Each support bracket 18 includes an attaching board 18A in the form of a flat plate (flange-shaped), and a box-like mount 18B fixed as by welding to the attaching board 18A and having an opening 18C facing downward. The attaching board 18A is detachably fastened to the tractor body 4 by a plurality of bolt 19. For this purpose, the attaching board 18A has bolt receiving bores.

The mount 18B is box-shaped with strip-shaped front and rear side plates 18E, a flat top plate 18F connected between the side plates 18E, and a cross plate 18G connected between horizontally projecting ends of the side plates 18E. The top plate 18F defines a mounting bore 18H for attaching a cushion coupling 11. The front and rear side plates 18E define mounting bores 18I for attaching the dynamic damper 12.

As shown in FIG. 5, the cushion coupling 11 includes a pair of annular rubber cushions 20 arranged vertically across the top plate 18F and defining a cylindrical boss 20A having an outer profile for fitting in the mounting bore 18H. Each rubber cushion 20 is mounted in a receiving pan 21. A cylindrical sleeve 22 penetrating the rubber cushions 20 extends between the receiving pans 21 disposed at the upper and lower ends of the pair of rubber cushions 20, respectively. The cylindrical sleeve 22 receives a fastening device 23 shown as a bolt and nut. By tightening the fastening device 23, the cab framework (i.e. the step or floor sheet 9H in the illustrated example) or a post of a safety frame is secured to the support bracket 18 through the rubber cushions 20.

The dynamic damper 12 according to this invention, when mounted in the support bracket 18, acts as part of the damping support apparatus 100 for performing damping action in combination with the cushion coupling 11.

For reliably mounting the dynamic damper 12 in the support bracket 18, as shown in FIG. 2, the holder 13 has mounting lugs 25 fixed to opposite end positions thereof, with back nuts 25A welded thereto. The damper 12 is inserted with nut portions (mounting bores) of the pair of mounting lugs 25 in register with the attachment bore 18I, and fixed in place by fastening devices (bolts) 26. In this way, the dynamic damper 12 is reliably placed inside the box-like support bracket 18. At this time, the mounting lugs 25 are fastened by the fastening devices 26, with the caps 17 of dynamic damper 12 placed in contact with inner surfaces of front and rear side plates 18E. This assembling operation may be carried out easily, and the caps 17 are retained in place by the side plates 18E to assure the waterproof function.

Of course, the dynamic damper 12 may be attached to an upper surface, a front or rear surface, or at a free end (projecting end) of the support bracket 18. However, where the dynamic damper 12 is mounted inside the support bracket 18, the latter acts as a protective cover therefor.

It is preferable to attach the dynamic damper 12 adjacent the projecting end of support bracket 18. That is, an increased damping effect is produced by placing the dynamic damper 12 remote from the tractor body 4.

In addition, the damping function is variable with the mass (weight) and mounting position of the dynamic damper 12, and the range of vibration is multifarious. As shown in FIG. 6, mounting bores 18H may be formed as spaced from each other longitudinally of the support bracket 18. Then, the mounting position of the dynamic damper 12 may advantageously be adjusted according to vibration characteristics such as vibration frequency. Alternatively, the mounting bores 18H may be in the form of slots elongated longitudinally of the support bracket 18, so that the mounting position of the dynamic damper 12 may be adjusted steplessly within the range of these slots.

In FIG. 2, the mounting lugs 25 extend inwardly (toward the tractor body). Instead, the mounting lugs 25 may be formed to extend outwardly where desirable.

Figure 7:
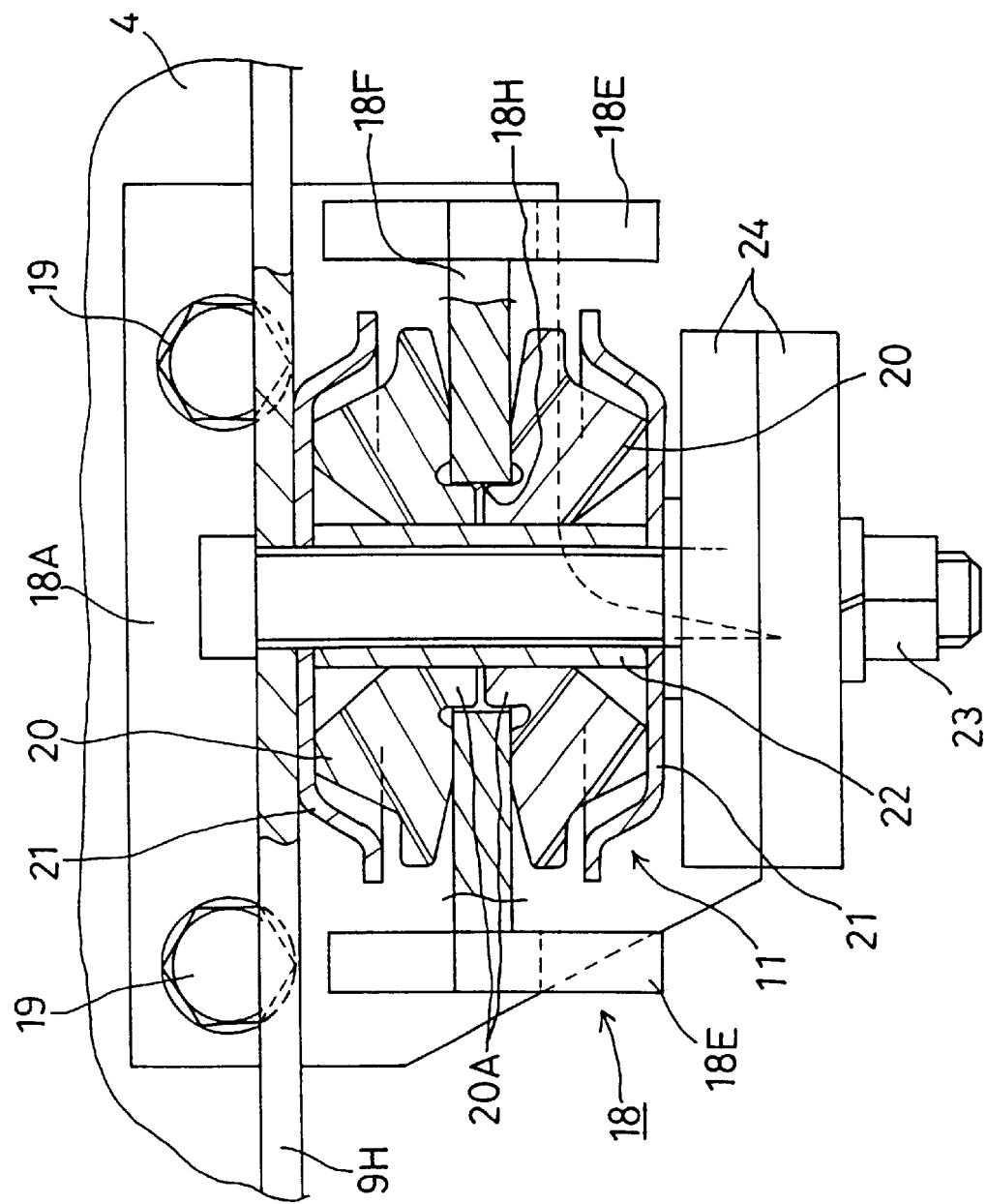
FIG. 7 is a side elevation of a tractor.

FIG. 7 shows a modification of the cushion coupling 11. In this cushion coupling device 11, one or more sleeve-like dampermasses 24 are mounted on a lower shank portion of a bolt acting as a fastening device 23. The dampermass or dampermasses 24 shift(s) a resonance point of the fastening device 23 acting as a vibration transmitting member, thereby to lower the overall vibration intensity.

Figure 8:
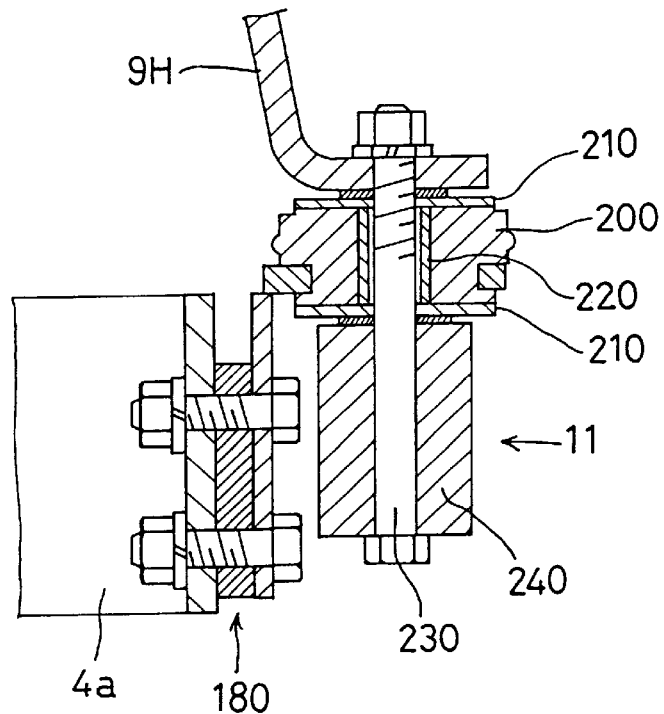
FIG. 8 is a sectional view showing a further example of cushion coupling.

FIG. 8 shows a further example of cushion coupling 11. Here, an angled support bracket 180 is attached through a rubber cushion to a support bracket 4a projecting laterally of the tractor body 4. A cushion coupling 11 is mounted between a horizontal portion of support bracket 180 and the cab framework 9H. This cushion coupling 11 also includes an annular rubber cushion 200 inserted in bores formed in the horizontal portions of support bracket 180, a cylindrical sleeve 220 inserted in the bore, receiving pans 210 disposed at opposite ends of the annular rubber cushion 200, and a sleeve-like dampermass 240 mounted on a lower shank portion of a bolt 230 for fixing the cushion coupling 11 between the support bracket 180 and cab framework 9H.

Figure 9:
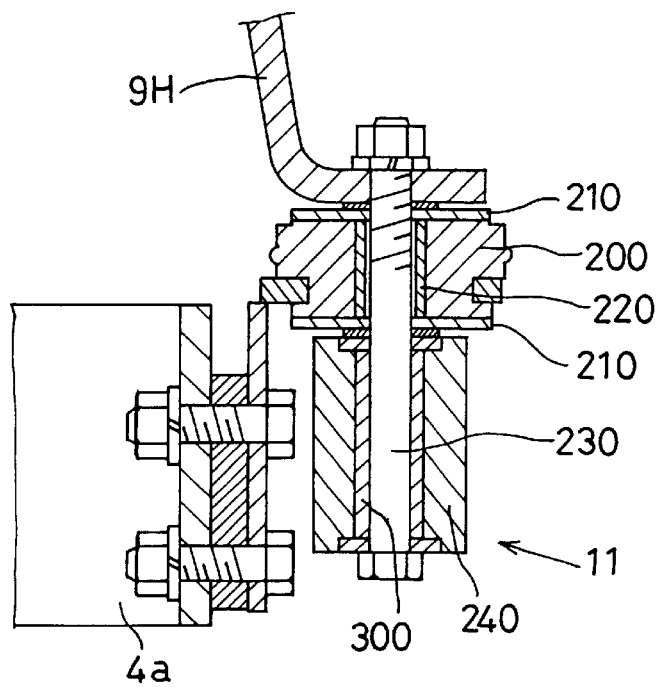
FIG. 9 is a sectional view showing a modification of the cushion coupling shown in FIG. 8.

FIG. 9 shows a modification of the cushion coupling 11 shown in FIG. 8. In this example, a rubber sleeve 300 is inserted in the center bore of dampermass 240 to avoid a metal-to-metal contact between the inner peripheral surface of dampermass 240 and the bolt 230.

What is claimed is:

1. A dynamic damper of a damping support apparatus combination with a vehicle body and an onboard structure fixed thereto, said vehicle body including a cantilevered support bracket, with a cushion coupling disposed between said onboard structure and said support bracket, wherein said dynamic damper is provided at a free end of said support bracket cantilevered by said vehicle body, with said dynamic damper comprising:

a cylindrical holder;
a bar-shaped dampermass mounted in said holder so as to form a gap with an inner peripheral surface of said holder; and
an elastomer disposed in at least part of said gap.

2. A dynamic damper as defined in claim 1, wherein said holder has caps attached to opposite ends thereof for restricting movement in longitudinal directions of said bar-shaped dampermass.

3. A dynamic damper as defined in claim 2, wherein said caps comprise an elastomer.

4. A dynamic damper as defined in claim 2, wherein said caps are in sealing contact with said opposite ends of said holder to prevent entry of water to said holder.

5. A dynamic damper as defined in claim 1, wherein said elastomer comprises a plurality of O-rings mounted, as spaced from each other, peripherally of said bar-shaped dampermass.

6. A damping support apparatus fixing an onboard structure to a vehicle body, comprising:

a support bracket attached to said vehicle body, said support bracket cantilevered from said vehicle body;
a cushion coupling disposed between said onboard structure and said support bracket; and
a dynamic damper attached to said support bracket and adjacent said cushion coupling, said dynamic damper provided at a free end of said support bracket cantilevered by said vehicle body and adapted to shift a resonance point of vibration transmitted to said support bracket, said dynamic damper including:
a cylindrical holder;
a mounting bracket formed on said holder and having a connecting portion for connection to said support bracket,
a bar-shaped dampermass mounted in said holder so as form a gap with an inner peripheral surface of said holder; and
an elastomer disposed in at least part of said gap.

7. A damping support apparatus as defined in claim 6, wherein said dynamic damper is disposed between said cushion coupling and said free end of said support bracket.

8. A damping support apparatus as defined in claim 6, wherein said support bracket is box-shaped to contain said damper therein.

9. A damping support apparatus as defined in claim 6, wherein said dynamic damper is disposed to have said bar-shaped dampermass extending in a traveling direction of said vehicle body.

10. A dynamic damper as defined in claim 6, wherein said holder has holder has caps attached to opposite ends thereof for restricting movement in longitudinal directions of said bar-shaped dampermass.

11. A dynamic damper as defined in claim 10, wherein said caps comprise an elastomer.

12. A dynamic damper as defined in claim 10, wherein said caps are in sealing contact with said opposite ends of said holder to prevent of water to said holder.

13. A dynamic damper as defined in claim 6, wherein said elastomer comprises a plurality of O-rings mounted, as spaced from each other, peripherally of said bar-shaped dampermass.

14. A damping support apparatus fixing an onboard structure to a vehicle body, comprising:

a support bracket attached to said vehicle body; and
a cushion coupling disposed between said onboard structure and said support bracket, said cushion coupling including:
an elastic member disposed between said onboard structure and said support bracket;
a connecting bolt extending vertically through said support bracket, said elastic member, and said onboard structure; and
a dampermass mounted at a free end of said connecting bolt and adapted to shift a resonance point of vibration transmitted to said connecting bolt, said free end being a lower end of said connecting bolt.

* * * * *

UNITED STATES PATENT AND TRADEMARK OFFICE
CERTIFICATE OF CORRECTION

PATENT NO. : 6,450,473 B1 Page 1 of 1
DATED : September 17, 2002
INVENTOR(S) : Kenji Kondo et al.

It is certified that error appears in the above-identified patent and that said Letters Patent is hereby corrected as shown below:

Column 2,
Line 40, "advantage s" should read -- advantages --.

Column 3,
Line 34, "17B The" should read -- 17B. The --.

Column 4,
Line 21, "bores 181" should read -- bores 18I --.
Line 47, "bore 181" should read -- bore 18I --.

Column 5,
Lines 39-40, "apparatus combination" should read -- apparatus in combination --.

Column 6,
Line 18, "bracket," should read -- bracket; --.
Lines 34-35, "said holder has holder has caps" should read -- said holder has caps --.
Line 42, "prevent of" should read -- prevent entry of --.

Signed and Sealed this

Eighteenth Day of February, 2003

JAMES E. ROGAN
*Director of the United States Patent and Trademark Office*